United States Patent
Isojärvi

(10) Patent No.: US 11,898,846 B2
(45) Date of Patent: Feb. 13, 2024

(54) APPARATUS, DEVICE AND COMPUTER IMPLEMENTED METHOD FOR PROVIDING MARINE VESSEL DATA OF MARINE VESSEL WITH PLURALITY OF SENSOR DEVICES

(71) Applicant: Wärtsilä Finland Oy, Vaasa (FI)

(72) Inventor: Juha-Antti Isojärvi, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 626 days.

(21) Appl. No.: 16/967,807

(22) PCT Filed: Feb. 13, 2018

(86) PCT No.: PCT/FI2018/050100
§ 371 (c)(1),
(2) Date: Aug. 6, 2020

(87) PCT Pub. No.: WO2019/158799
PCT Pub. Date: Aug. 22, 2019

(65) Prior Publication Data
US 2020/0363209 A1    Nov. 19, 2020

(51) Int. Cl.
*G07C 5/00* (2006.01)
*G01C 21/20* (2006.01)
(Continued)

(52) U.S. Cl.
CPC ............ *G01C 21/203* (2013.01); *G01S 19/42* (2013.01); *G04R 20/00* (2013.01); *G07C 5/00* (2013.01); *H04B 7/26* (2013.01)

(58) Field of Classification Search
CPC ............ G07C 5/00; H04B 7/26; G04R 20/00
(Continued)

(56) References Cited

U.S. PATENT DOCUMENTS

| 2009/0048726 A1 | 2/2009 | Lofall |
| 2009/0171520 A1* | 7/2009 | Kaji ............... G05D 1/0206 701/21 |

(Continued)

FOREIGN PATENT DOCUMENTS

| CA | 2960431 C | * | 4/2018 | ............ B63B 39/12 |
| CN | 101826873 B | * | 4/2014 | ............... G01V 1/32 |

(Continued)

OTHER PUBLICATIONS

W. Lang, R. Jedermann, D. Mrugala, A. Jabbari, B. Krieg-Brückner and K. Schill, "The "Intelligent Container"—A Cognitive Sensor Network for Transport Management," i IEEE Sensors Journal, vol. 11, No. 3, pp. 688-698, Mar. 2011, doi: 10.1109/JSEN.2010.2060480. (Year: 20011).*

(Continued)

*Primary Examiner* — Cuong H Nguyen
(74) *Attorney, Agent, or Firm* — Ziegler IP Law Group

(57) ABSTRACT

A computer implemented method for providing marine vessel data of a marine vessel with a plurality of sensor devices includes receiving a first sensor data item with first sensor data of a first sensor device of the plurality of sensor devices, associated with a first local timestamp generated based on a local clock; receiving a second sensor data item including second sensor data of a second sensor device of the plurality of sensor devices, associated with a second local timestamp generated based on the local clock and a first universal timestamp generated based on a universal clock; determining time correction value based on the second sensor data item's second local timestamp and the universal timestamp; and generating time information for the first sensor data of the first sensor device using the first local timestamp and the time correction value.

19 Claims, 7 Drawing Sheets

(51) Int. Cl.
  *G01S 19/42* (2010.01)
  *G04R 20/00* (2013.01)
  *H04B 7/26* (2006.01)
(58) Field of Classification Search
  USPC .......................................................... 701/21
  See application file for complete search history.

(56) References Cited

U.S. PATENT DOCUMENTS

| | | | | |
|---|---|---|---|---|
| 2012/0170412 A1* | 7/2012 | Calhoun | ............... | G01S 3/8083 367/118 |
| 2014/0310412 A1* | 10/2014 | Shinohara | .......... | G06Q 10/0833 709/224 |
| 2017/0247086 A1* | 8/2017 | Pyörre | .................... | B63B 49/00 |

FOREIGN PATENT DOCUMENTS

| | | | | | |
|---|---|---|---|---|---|
| DE | 60036650 T2 | * | 7/2008 | ............. | B28C 5/422 |
| GB | 2428799 A | * | 2/2007 | ............. | G01V 1/223 |
| WO | WO-2010039130 A1 | * | 4/2010 | ........... | G01S 5/0036 |
| WO | 2014120178 A1 | | 8/2014 | | |
| WO | 2018013047 A1 | | 1/2018 | | |
| WO | WO-2018013047 A1 | * | 1/2018 | ............. | G07C 5/008 |

OTHER PUBLICATIONS

Z. Sheng, C. Mahapatra, C. Zhu and V. C. M. Leung, "Recent Advances in Industrial Wireless Sensor Networks Toward Efficient Management in IoT," in IEEE Access, vol. 3, pp. 622-637, 2015, doi: 10.1109/ACCESS.2015.2435000.*
Open Interfaces for Connecting Automated Guided Vehicles to a Fleet Management System by Walter Quadrini et al., ; Procedia Manufacturing vol. 42, 2020, pp. 406-413; (Year: 2020).*
Rathnayaka, R. P. D. T., et al. "Fleet management with real-time data analytics." 2021 6th International Conference on Information Technology Research (ICITR). IEEE,. (Year: 2021).*
Flores Fernández, Alberto, et al. "Generation of Correction Data for Autonomous Driving by Means of Machine Learning and On-Board Diagnostics." Sensors 23.1: 159. (Year: 2023).*
Ikonomakis, Angelos, et al. "How good is the STW sensor? An account from a larger shipping company." Journal of Marine Science and Engineering 9.5: 465. (Year: 2021).*
International Search Report, Application No. PCT/FI2018/050100, dated Sep. 10, 2018, 3 pages.

* cited by examiner

APPARATUS, DEVICE AND COMPUTER IMPLEMENTED METHOD FOR PROVIDING MARINE VESSEL DATA OF MARINE VESSEL WITH PLURALITY OF SENSOR DEVICES

TECHNICAL FIELD

The present application generally relates to an apparatus, a device, a method and software code for providing marine vessel data of a marine vessel with a plurality of sensor devices generating sensor data. The present application further relates to a method, an apparatus and software code for generating time information for sensor data.

BRIEF DESCRIPTION OF RELATED DEVELOPMENTS

This section illustrates useful background information without admission of any technique described herein representative of the state of the art.

Modern vehicles, such as marine vessels, comprise huge data systems for data collection, data processing and transceiving with remote systems for various purposes. Possible purposes for data collection and processing include vessel operating optimization and/or remote control for autonomous vessel navigation. For example, fuel efficiency is an important factor when operating marine vessels. Only a slight reduction in fuel consumption, for example 1-2%, may produce a significant monetary reduction in operating costs of a marine vessel. Thus, there is a constant challenge to operate the marine vessel with as low costs as possible in terms of fuel efficiency and with as real-time as possible.

There are several parameters that influence the total fuel efficiency of a marine vessel, for example, speed through water (STW), speed over ground (SOG), draught, trim, propeller efficiency, wind direction and velocity, and significant wave height and direction. Some of these parameters are such that they can be somehow measured by the marine vessel itself and that the marine vessel's information systems have this information available.

However, some parameters may require a separate sensor or sensors to be installed to be able to record the parameter values without connection to the marine vessel information system at all. For example, to measure RPM (Revolutions Per Minute) of a propeller, it may be necessary to install a sensor to the propeller shaft or the main engine if the marine vessel cannot provide the RPM information otherwise. For security reasons, some sensors may also be arranged as independent sensors not connected to marine vessel information system at all.

Marine transportation vessels, such as container ships and tankers, consume large amounts of fuel. Recently, trends of digitalization and performance optimisation have led to the vessels using complex systems that produce large quantities of data related to the vessels' efficiency. However, by far the most critical measurements for evaluating vessel performance are those pertaining to vessel speed and energy consumption. Energy consumption roughly grows as the third power of speed, so it is extremely important to measure the speed accurately. The speed over ground (SOG) may be accurately evaluated using known space-based navigation systems like the Global Positioning System (GPS), but this is not equal to speed through water (STW) in the presence of ocean or tidal currents.

For example, the efficiency of the vessel, and hence for example the attained STW at a certain propeller revolution per minute (RPM), may depend on the hull and propeller condition, which can deteriorate due to biological fouling, paint degradation and other factors, or may improve due to a dry docking or cleaning of the hull. To achieve a nearly real-time hull and propeller performance tracking, an accurate speed through water (STW) is required to distinguish the slowly evolving fouling signal from the noisy background. Also, assessing the on-board efficiency of any navigational operation, the key is to know how much the vessel has gained or lost in speed if the RPM or power is kept constant.

One of the most common sensor type to measure speed through water (STW) for a vessel is the Doppler Log that transmits ultrasound pulses from the vessel, and measures the backscatter echo. The frequency shift (Doppler shift) may be utilized to calculate the speed of the vessel through water. However, this technique of measuring speed through water (STW) fails to provide an accurate reading in water with a lesser amount of impurity because the technique calculates the speed through water (STW) based on the backscatter echo from bubbles, biological material, and turbidity in water.

When examining Doppler Log data, two separate issues stand out. First, due to the aforementioned difficulties, the noise level in the speed measurement is often high, and the speed logs can sometimes behave in a very erratic manner. Secondly, the speed logs experience calibration issues, which means that the long-term average difference between speed over ground (SOG) and the measured speed through water (STW) clearly differs from zero. Moreover, the calibration error can change over time, either due to crew recalibrating the speed through water (STW) Log device or due to calibration depending on circumstances, such as sea water temperature. Alternatively, STW can be approximated using modelling based on propeller RPM alone but this approximation is crude and does not provide an accurate speed through water (STW).

If there is a desire to perform a more detailed analysis of some or all the parameters, one must have access to all possible data sensors and have as reliable time information for the associated sensor data as possible.

Additionally, as discussed above, it may also be necessary to install new sensors to have the necessary information available. Installation should be as easy as possible and ensure high reliability and security.

Integration to the systems of a marine vessel, in order to have access to desired parameters of the marine vessel, is a complicated and time consuming task. Since systems of marine vessels usually differ from each other, the integration task is usually also vessel-specific. This means that for each marine vessel, the marine vessel must be inspected thoroughly to be able to determine how the integration can be done and what needs to be done. The integration task also requires specific skills from the people implementing the integration or even a third-party service engineer to visit the ship.

Some methods have been developed to gather sensor data from a vessel. However, there still exists a problem that a vast and ever increasing number of sensors and related data need reliable timestamps for later data analysis and processing. Such problem relates, for example, when determining speed through water (STW).

Thus, an easy to set-up, accurate, and highly functional and reliable solution is needed to provide more accurate sensor data system.

SUMMARY

According to a first example aspect of the disclosed embodiments there is provided a computer implemented method for providing marine vessel data of a marine vessel with a plurality of sensor devices, the method comprising:

receiving a first sensor data item comprising first sensor data of a first sensor device of the plurality of sensor devices, the first sensor data being associated with a first local timestamp generated based on a local clock;

receiving a second sensor data item comprising second sensor data of a second sensor device of the plurality of sensor devices, the second sensor data being associated with a second local timestamp generated based on the local clock and with a first universal timestamp generated based on a universal clock;

determining time correction value based on the second sensor data item's second local timestamp and the first universal timestamp; and generating time information for the first sensor data of the first sensor device using the first local timestamp and the time correction value.

In an embodiment, the second sensor device is configured to be integrated to the marine vessel's information system, and the first sensor device is configured not to be integrated to the marine vessel's information system.

In an embodiment, the first sensor device is configured to be integrated to a stand-alone local computer system within the marine vessel.

In an embodiment, the method further comprises:

receiving a third sensor data item prior to receiving the first sensor data item, the third sensor data item comprising third sensor data of a third sensor device of the plurality of sensor devices, the third sensor data being associated with a third local timestamp generated based on the local clock and a second universal timestamp generated based on the universal clock, wherein the second universal timestamp is chronologically before the first universal timestamp;

determining second time correction value based on the third sensor data item's third local timestamp and the second universal timestamp; and generating time information for the first sensor data of the first sensor device using the first local timestamp and the first and the second time correction values.

In an embodiment, the method further comprises:

generating the time information for the first sensor data of the first sensor device using the first local timestamp and the first and the second time correction values by linear interpolation of the first and the second time correction values.

In an embodiment, the method further comprises:

receiving a local clock data item triggered by a local clock synchronization event, wherein the local clock data item comprises the time correction value used for the local clock synchronization and at least one of the following: a local timestamp and a universal timestamp indicating the time of the synchronization event, and wherein local clock information of the local clock is determined based on a local computer device of the marine vessel.

In an embodiment, universal clock information of the universal clock is determined based on a vessel receiver device, comprising at least one of the Global Positioning System (GPS) receiver and a communication interface of the marine vessel, wherein the universal clock information comprises at least one of the following: a Global Positioning System (GPS) time and a Coordinated Universal Time (UTC).

In an embodiment, the method further comprises:

maintaining the local clock information generated by the local clock at a local computer device at the marine vessel with the plurality of sensor devices for providing local timestamps; and maintaining the universal clock information generated by the universal clock as trusted clock information for providing universal timestamps.

In an embodiment, the sensor data item further comprises a sensor device identifier for identifying the sensor device generating the sensor data within the sensor data item.

In an embodiment, the method further comprises:

generating a synchronization message for a local computer device in response to determining the time correction value, wherein the synchronization message comprises the time correction value; and transmitting the synchronization message for the local computer device for synchronizing the local clock of the local computer device based on the time correction value.

In an embodiment, the sensor data relates to performance data of the marine vessel measured by at least one sensor device.

In an embodiment, the at least one sensor device for measuring marine vessel performance data comprises an acceleration sensor operable to measure vibrations and configured to determine speed of rotation of a propeller of the marine vessel based on the measured vibrations.

In an embodiment, the method further comprises:

generating marine vessel data based on the received sensor data of the first and the second sensor device and using the generated time information for the sensor data of the first sensor device.

In an embodiment, the method further comprises:

determining performance optimization, navigation, or maneuvering information based on the generated marine vessel data; and transmitting the determined information for the marine vessel.

In an embodiment, the method further comprises:

receiving first sensor data item from each of the plurality of the marine vessels, each first sensor data item comprising first sensor data of a first sensor device of the plurality of sensor devices, the first sensor data being associated with a first local timestamp generated based on the local clock;

receiving second sensor data item from each of the plurality of the marine vessels, each second sensor data item comprising second sensor data of a second sensor device of the plurality of sensor devices, associated with a second local timestamp generated based on the local clock and a first universal timestamp generated based on the universal clock;

determining time correction value for each first sensor data item based on respective second sensor data item's second local timestamp and the first universal timestamp; and generating time information for the first sensor data of the first sensor device using the respective first local timestamp and the respective time correction value.

In an embodiment, the method further comprises:

generating marine vessel fleet data based on the received sensor data of the plurality of marine vessels and using the generated time information for the sensor data for a plurality of marine vessels of the marine vessel fleet.

In an embodiment, the method further comprises:
determining fleet performance optimization, navigation, or maneuvering information based on the generated marine vessel fleet data; and
transmitting the determined information for the plurality of marine vessels.

According to a second example aspect of the disclosed embodiments there is provided a server apparatus for providing marine vessel data of a marine vessel with a plurality of sensor devices, comprising:
a communication interface;
at least one processor; and
at least one memory including computer program code;
the at least one memory and the computer program code configured to, with the at least one processor, cause the apparatus to:
receive a first sensor data item comprising first sensor data of a first sensor device of the plurality of sensor devices, the first sensor data being associated with a first local timestamp generated based on a local clock;
receive a second sensor data item comprising second sensor data of a second sensor device of the plurality of sensor devices, the second sensor data being associated with a second local timestamp generated based on the local clock and a first universal timestamp generated based on a universal clock;
determine time correction value based on the second sensor data item's second local timestamp and the first universal timestamp; and
generate time information for the first sensor data of the first sensor device using the first local timestamp and the time correction value.

In an embodiment, the at least one memory and the computer program code are further configured to, with the at least one processor, cause the apparatus to:
receive a third sensor data item prior to receiving the first sensor data item comprising sensor data of a third sensor device of the plurality of sensor devices, associated with a third local timestamp generated based on the local clock and a second universal timestamp generated based on the universal clock, wherein the second universal timestamp is before the first universal timestamp;
determine second time correction value based on the third sensor data item's local timestamp and the universal timestamp; and
generate time information for the first sensor data of the first sensor device using the first local timestamp and the first and the second time correction values.

According to a third example aspect of the disclosed embodiments there is provided a sensor apparatus comprising:
a plurality of sensor devices;
a communication interface;
at least one processor; and
at least one memory including computer program code;
the at least one memory and the computer program code configured to, with the at least one processor, cause the apparatus to:
transmit a first sensor data item comprising first sensor data of a first sensor device of the plurality of sensor devices, the first sensor data being associated with a first local timestamp generated based on a local clock;
transmit a second sensor data item comprising second sensor data of a second sensor device of the plurality of sensor devices, the second sensor data being associated with a second local timestamp generated based on the local clock and a first universal timestamp generated based on a universal clock, wherein time correction value is configured to be determined based on the second sensor data item using the second local timestamp and the first universal timestamp, and time information is configured to be generated for the first sensor data of the first sensor device using the first local timestamp and the time correction value.

In an embodiment, the communication interface comprises at least one of the following: a Global Positioning System (GPS) receiver and a communication interface for transceiving information over a network.

Different non-binding example aspects and embodiments of the disclosure have been illustrated in the foregoing. The above embodiments are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
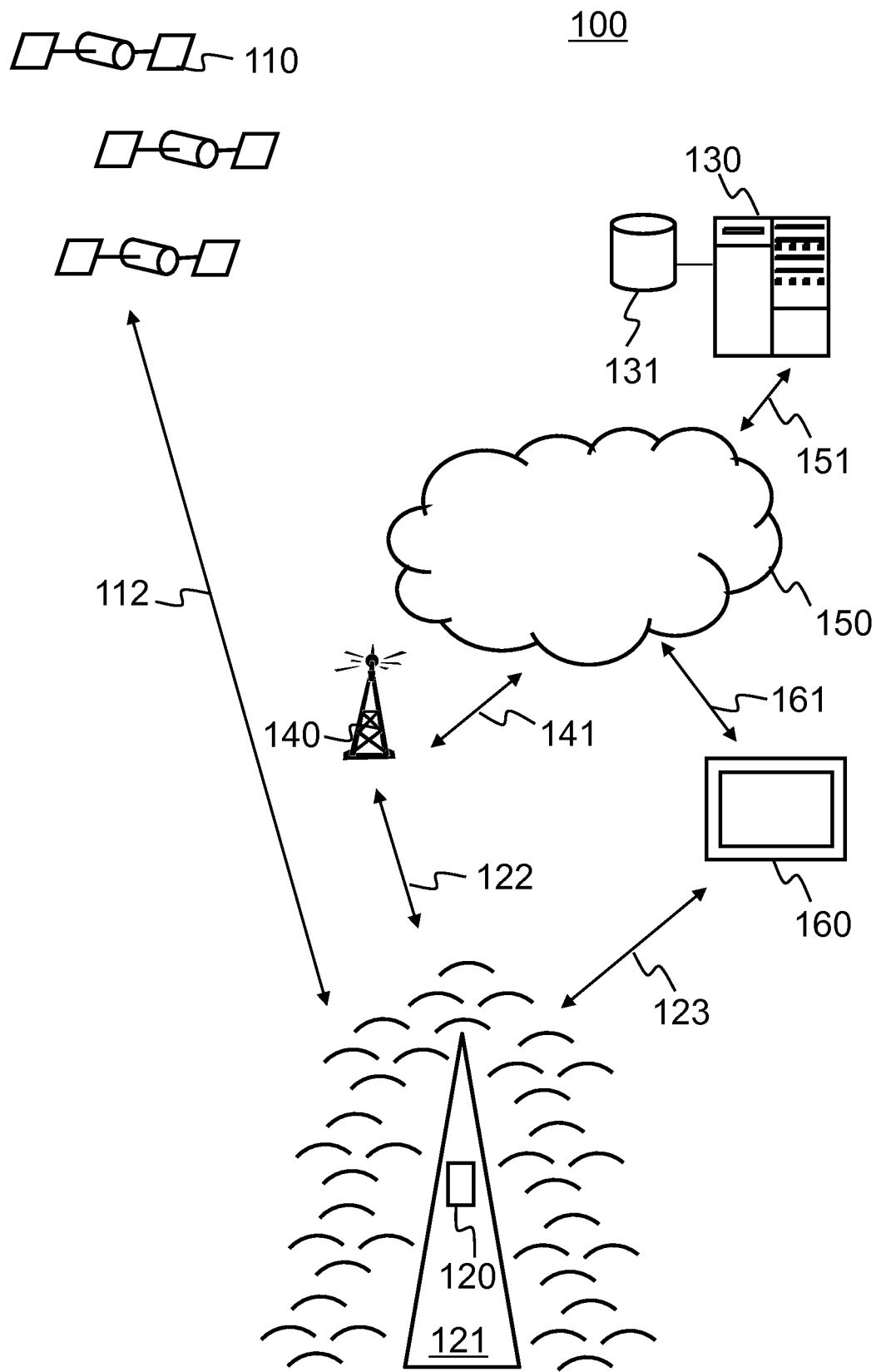
FIG. 1 shows a schematic picture of a system according to an aspect of the disclosed embodiments.

FIG. 1 shows a schematic picture of a system 100 according to an example embodiment. A marine vessel 121 may comprise an apparatus 120 comprising means for generating, processing and transceiving vessel related data through a communication interface, for example. The apparatus 120 is capable of downloading and locally executing software program code. The software program code may be a client application of a service whose possible server application is running on a server apparatus 130, 131 of the system 100. The apparatus 120 may comprise a capturing device, such a sensor device, for providing vessel related signals. The sensor device may comprise an accelerometer, an inclinometer, a gyroscope, a temperature sensor, a pressure sensor, or a camera, for example. The camera may also be used to provide video data and a microphone may be used for providing audio data, for example.

In the present description, by vessel are meant any kinds of waterborne vessels, typically marine vessels. Most typically the vessel is a cargo ship or large cruise vessel, but the present disclosure is also applicable for yachts, for example.

The apparatus 120 is configured to be connectable to a public network 150, such as Internet, directly via local connection or via a wireless communication network 140 over a wireless connection 122. The wireless connection 122 may comprise a mobile cellular network, a satellite network or a wireless local area network (WLAN), for example. The wireless communication network 140 may be connected to a public data communication network 150, for example the Internet, over a data connection 141. The apparatus 120 may be configured to be connectable to the public data communication network 150, for example the Internet, directly over a data connection that may comprise a fixed or wireless mobile broadband access. The wireless communication network 140 may be connected to a server apparatus 130 of the system 100, over a data connection.

In an embodiment, an apparatus 120 may set up local connections within the marine vessel 121 with at least one capturing device and a computer device. The capturing device, such as a sensor, may be integrated to the apparatus 120 or the marine vessel 121, attached to the hull of the marine vessel 121 and connected to the vessel control system or arranged as separate sensor device and connectable to the network 150 over separate connection.

The apparatus 120 and its client application may allow the apparatus 120 to log into a vessel data service run on a server 130, for example.

Real-time interaction may be provided between the apparatus 120 and the server 130 to collaborate for marine vessel data over a network 150. Real-time interaction may also be provided between the apparatus 120 and the remote user device 160 to collaborate for marine vessel data over a network 150, 161.

A sensor data item is generated by a sensor device of the marine vessel 121 and transmitted to the server 130. Sensor data items may be processed at the apparatus 120 before transmitting or they may be sent without further processing.

Sensor data may also be stored within the apparatus 120 before transmission over the network 150. Then again, transmitted sensor data may be stored/and or processed at the server apparatus 130 or at the remote user device 160.

A capturing device (e.g. a sensor device) may capture and send sensor data as a real-time content or non-real time data to the server apparatus 130 or to the remote user device 160 over a peer-to-peer connection formed over network, for example.

The apparatus 120 may be connected to a plurality of different capturing devices and instruments and the apparatus 120 may be configured to select which sensor devices is actively collaborated with.

The user of the apparatus 120 or the remote user device 160 may need to be logged in with user credentials to a chosen service of the network server 130.

In an embodiment, the system 100 comprises a sensor device configured to be comprised by or connectable to the apparatus 120 over a local connection. The local connection may comprise a wired connection or a wireless connection. The wired connection may comprise Universal Serial Bus (USB), High-Definition Multimedia Interface (HDMI), SCART interface or RCA interface, for example. The wireless connection may comprise acoustic connection, Bluetooth™, Radio Frequency Identification (RF-ID) or wireless local area network (WLAN), for example. Near field communication (NFC) may be used for sensor device identification between the sensor device and the apparatus 120, for example.

A sensor device may also be connected directly to the public network 150, such as Internet, via direct local connection or via a wireless cellular network connection 140, 141.

In an embodiment, the system 100 may comprise a server apparatus 130, which comprises a storage device 131 for storing service data, service metrics and subscriber information, over data connection 151. The service data may comprise configuration data; account creation data; sensor data; sensor ID's; reference data items, user input data; real-time collaboration data; predefined settings; and attribute data, for example.

In an embodiment, a proprietary application in the apparatus 120 may be a client application of a service whose server application is running on the server apparatus 130 of the system 100.

The proprietary application of the apparatus 120 may receive sensor input data and provide the output data. The input data may comprise data captured by the capturing device, such as a sensor device or a camera.

In an embodiment, configuration information or application download information for any apparatus may be automatically downloaded and configured by the server 130. Thus, the user of the devices may not need to do any initialization or configuration for the service. The system server 130 may also take care of account creation process for the service, such sensor devices, apparatuses and users.

In an embodiment, the association of the devices can be one-time or stored persistently on any of the devices or the server 130.

In an embodiment, authentication of a sensor device or apparatus 120 on a system server 130 may utilize hardware or SIM credentials, such as International Mobile Equipment Identity (IMEI) or International Mobile Subscriber Identity (IMSI). The sensor device or apparatus 120 may transmit authentication information comprising IMEI and/or IMSI, for example, to the system server 130. The system server 130 authenticates the device by comparing the received authentication information to authentication information of registered users/devices/vessels/apparatuses stored at the system server database 131, for example. Such authentication information may be used for pairing the devices and/or apparatuses to generate association between them for a vessel data connection.

In an embodiment, a service web application may be used for configuration of a system. The service web application may be run on any user device, admin device, or a remote control device 160, such as a personal computer connected to a public data network, such as Internet 150, for example. The control apparatus 160 may also be connected locally to the apparatus 120 over a local connection 123 and may utilize the network connections of the apparatus 120 for configuration purposes. The service web application of the control apparatus may provide searching/adding instruments, determining attributes, device setup and configuration, for example. The service web application of the control apparatus 160 may be a general configuration tool for tasks being too complex to be performed on the user interface of the apparatus 120, for example.

In an embodiment, a remote control apparatus 160 may be authenticated and configuration data sent from the control apparatus 160 to the system server 130, 131, wherein configuration settings may be modified based on the received data. In an embodiment, the modified settings may then be sent to the apparatus 120 over the network 150 and the local connection or the wireless operator. The modified settings may also be sent to external devices correspondingly, through the apparatus 120 or directly over the network 150, for example.

In an embodiment, the sensor device may be wireless or wired.

In an embodiment, the marine vessel 121 or the apparatus 120 comprises a first clock (local clock) and a second clock (universal clock), and a method further comprises receiving a synchronization message configured to synchronize the first clock based on the second clock. The synchronization message for a local computer device may be generated in response to determining the time correction value, wherein the synchronization message comprises the time correction value, and the synchronization message may be transmitted for the local computer device for synchronizing the local clock of the local computer device based on the time correction value.

The system 100 may also comprise a plurality of satellites 110 in orbit about the Earth. The orbit of each satellite 110 is not necessarily synchronous with the orbits of other satellites and, in fact, is likely asynchronous. A global positioning system receiver apparatus such as the ones described in connection with preferred embodiments of the present disclosure is shown receiving spread spectrum global positioning system (GPS) satellite signals 112 from the various satellites 110.

The remote control apparatus 160 may be configured to be operated by a remote operator of the vessel 121. The remote control apparatus 160 may be arranged on a ground station, on the vessel 121 or on another vessel, for example.

Figure 2:
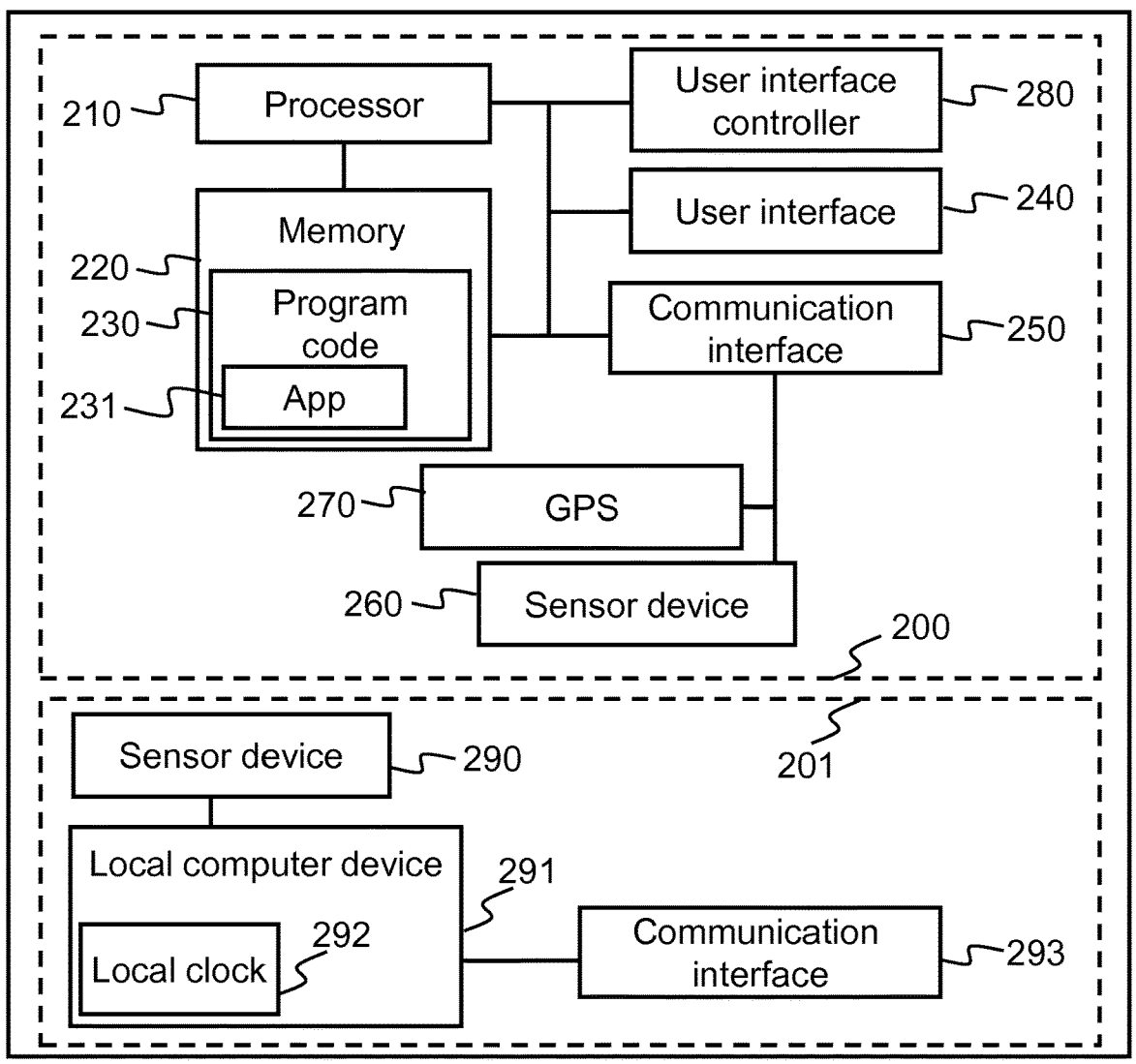
FIG. 2 presents an example block diagram of a sensor device apparatus in accordance with an example embodiment.

FIG. 2 presents an example block diagram of a marine vessel apparatus 120 in which various embodiments of the present disclosure may be applied. The apparatus 120 may be a user equipment (UE), user device or apparatus, such as a vessel computer system.

The general structure of the apparatus 120 comprises a user interface 240, a communication interface 250, a satellite positioning device (GPS) 270, a capturing/sensor device 260 for capturing current activity data and/or current environmental data relating to the vessel, a processor 210, and a memory 220 coupled to the processor 210. The apparatus 120 further comprises software 230 stored in the memory 220 and operable to be loaded into and executed in the processor 210. The software 230 may comprise one or more software modules and can be in the form of a computer program product. The user apparatus 210 may further comprise a user interface controller 280.

The processor 210 may be, e.g., a central processing unit (CPU), a microprocessor, a digital signal processor (DSP), a graphics processing unit, or the like. FIG. 2 shows one processor 210, but the apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 120 may comprise a plurality of memories. The memory 220 may be constructed as a part of the apparatus 120 or it may be inserted into a slot, port, or the like of the apparatus 120 by a user. The memory 220 may serve the sole purpose of storing data, or it may be constructed as a part of an apparatus serving other purposes, such as processing data. A proprietary sensor data application (client application) 231, activity data and environmental data may be stored to the memory 220.

The user interface controller 280 may comprise circuitry for receiving input from a user of the apparatus 120, e.g., via a keyboard, graphical user interface shown on the display of the user interfaces 240 of the user apparatus 120, speech recognition circuitry, or an accessory device, such as a headset, and for providing output to the user via, e.g., a graphical user interface or a loudspeaker.

The satellite positioning device 270 is configured to provide location information. Such information may comprise, for example, position coordinates, speed, direction of movement; and altitude information.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution), or 5G radio module. The wired interface may comprise such as universal serial bus (USB) or National Marine Electronics Association (NMEA) 0183/2000 standard for example. The communication interface module 250 may be integrated into the apparatus 120, or into an adapter, card or the like that may be inserted into a suitable slot or port of the apparatus 120. The communication interface module 250 may support one radio interface technology or a plurality of technologies. The apparatus 120 may comprise a plurality of communication interface modules 250.

A skilled person appreciates that in addition to the elements shown in FIG. 2, the apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 120 may comprise a disposable or rechargeable battery (not shown) for powering when external power if external power supply is not available.

In an embodiment, the apparatus 120 comprises speech recognition means. Using these means, a pre-defined phrase may be recognized from the speech and translated into control information for the apparatus 120, for example.

The satellite positioning device 270 and the sensor device 260 may be configured to be comprised by the apparatus 120 or connected as separate devices to the apparatus 120. In case the satellite positioning device 270 and the capturing device 260 are comprised in the apparatus 120 they may be connected to the apparatus 120 using an internal bus of the apparatus 120. In case the satellite positioning device 270 and the sensor device 260 are external devices connected to the apparatus 120 they may be connected to the apparatus 120 using communication interface 250 of the apparatus 120 or using the internal bus.

The apparatus 120 further comprises a sensor device 290 not connected to the internal bus and the main processor 210 and memory 220. Such sensor device 290 may be connected to a local computer device 291 with a local clock device 292. Furthermore, sensor data items with sensor data provided by the sensor device 290 may be transmitted over a communication interface 293. Alternatively, sensor data items with sensor data provided by the sensor device 290 may be provided for and transmitted by the communication interface 250. Local clock information of the local clock 292 may be determined based on the local computer device 291. The local clock information may comprise at least a system time of the local computer device 291, for example epoch time (e.g. counter value since an epoch).

In an embodiment, a second sensor device 260 is configured to be integrated to a marine vessel's 121 information system 200, and the first sensor device 290 is configured not to be integrated to the marine vessel's 121 information system 200.

In an embodiment, the first sensor device 290 is configured to be integrated to a stand-alone local computer system 201 within the marine vessel 121.

In an embodiment, a sensor device 290 is operationally connected to a local computer device 291 isolated from the main system 200. No matter a single sensor 290 is shown, the sensor 290 may comprise a plurality of sensors 290. The sensor devices 290 may be configured to, for example, measure marine vessel performance data.

In an embodiment, a communication interface (see e.g., FIG. 3) of the sensor device 290 itself or the communication interface 293 of the stand-alone local computer system 201 comprises an automatic identification system (AIS) receiver for receiving a wireless transmission comprising automatic identification system data from the marine vessel 121. The AIS receiver may include an antenna configured to receive the automatic identification system data or the sensor device 290 may include an antenna configured to receive the automatic identification system data. In another example, AIS receiver is configured to receive the automatic identification system data from an antenna external to the sensor device 290.

In an embodiment, the local computer device 291 is configured to generate sensor data items based on the received automatic identification system data and sensor data. The sensor data item may thus comprise sensor data generated by the sensor device 290, a timestamp based on local clock 292 and an identifier information. The identifier information may comprise at least one of the following: sensor-ID (S-ID); and vessel-ID (V-ID) (see also FIG. 11) that comprises at least part of the received automatic identification system data. Clock and time information is taken from the local clock 292.

The sensor data item may also comprise information identifying the marine vessel (for example, International Maritime Organization (IMO) ship identification number or Maritime Mobile Service Identity (MMSI)). This identifying information may be taken from the automatic identification system (AIS) signal or it may be stored within the local computer device 291 when installed.

The sensor data relating to the marine vessel performance and measured by the at least one sensor device 260, 290 may comprise measured data values as they were measured and/or data after processing at least some of the measured data values first.

In an embodiment, universal clock information of a universal clock of the marine vessel system 200 is determined based on a vessel receiver device, comprising at least one of the Global Positioning System (GPS) receiver 270 and a communication interface 250 of the marine vessel. The universal clock information may comprise at least one of the following: a Global Positioning System (GPS) time and a Coordinated Universal Time (UTC). The local clock information may be synchronized using the universal clock information, wherein the synchronization is done when the local computer device 291 and an apparatus 200 maintaining the universal clock information are connected to each other for data transfer.

In an embodiment, it is provided a method for determining the speed through water of the marine vessel for optimisation of vessel operation, using a sensor system with a plurality of sensors comprising at least one first sensor 290 of a first type and at least one second sensor 260, 270 of a second type 260, 270. The method comprises obtaining propeller revolutions per minute and at least one of torque at propeller, propulsion power, thrust, and engine fuel consumption using at least one first sensor 290, obtaining speed over ground of the vessel using at least one second sensor 260, 270; and using the obtained data and hydrodynamic modeling to determine the speed through water of the vessel. The sensor data may be sent to the server apparatus as raw sensor data and the processing of the data and determination of vessel data may be carried out at the server. Additional first sensors 290 may be used, for example, to provide wind and sea state information that can also be used for determining vessel data, such as speed through water (STW). Traditionally, optimising operation of the vessel has been carried out using the STW measured by an STW log, which is inadequate due to calibration and noise issues. Hydrodynamic modeling data may be maintained at the vessel main system 200, e.g. in memory 220, and the hydrodynamic modeling data may be updated and downloaded from the server apparatus 130 over the network 150 when access is available, such as when docked in a harbor, for example.

In an embodiment, at least one of the propeller revolutions per minute, torque at propeller, propulsion power, thrust and engine fuel consumption is a measurement value resulting from a corresponding indirect measurement based on vessel vibrations, and the optimization is selected from a group comprising: optimizing time to clean the hull of the marine vessel; optimization of steering of the marine vessel; optimizing speed profile of a voyage; and optimizing voyage route.

For at least one first sensor 290, instead of a direct measurement of for example the propeller revolutions, it is possible to obtain this measurement value or data from an indirect measurement based on vessel vibrations detected by the sensor 290 attached to the vessel hull, for example. Such indirect measurement may not lead to the same numerical value, but it gives the relative value. Such a relative value can then be taken into account in the final calculation of the speed through water, for example.

Figure 3:
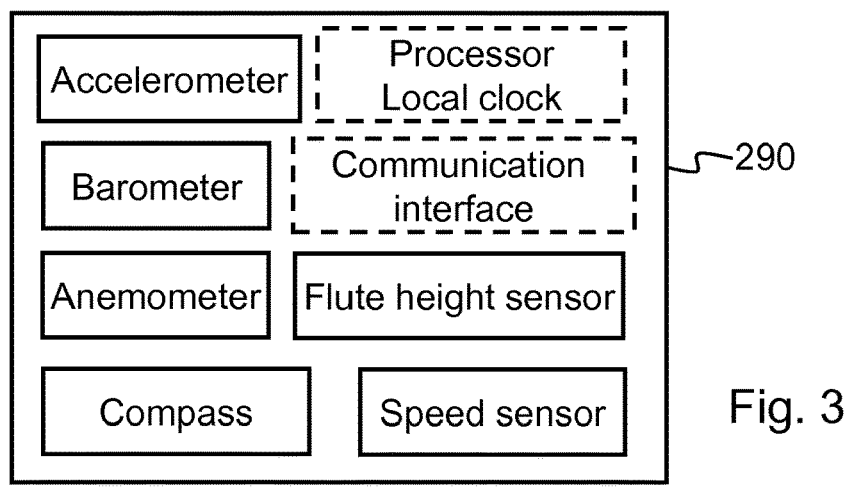
FIG. 3 presents an example block diagram of a sensor device in accordance with an example embodiment.

FIG. 3 presents an example block diagram of a sensor device 290 in which various embodiments of the present disclosure may be applied. The sensor device 290 may comprise various means for activity data detection and environmental data detection, for example. The sensor device 290 may be used for both vessel related data and environmental data capturing. The sensor device 260 may correspond to the sensor device 290 elements illustrated in FIG. 3.

In an embodiment, the sensor device 290 may comprise at least one of the following devices: an inclinometer; an accelerometer; a gyroscope; an anemometer for providing wind information; a wind sensor for providing wind information; a sensor for providing flute height information; a barometer for measuring air pressure; a temperature sensor for measuring environmental temperature; a water depth sensor for measuring depth information; a chart plotter for providing position information; a sail sensor for providing sail information; a speed sensor for providing speed information; a video camera for providing a video signal; and a compass for providing direction information.

In an embodiment, the sensor device 260, 290 and the processing of the sensor data may provide a plurality of parameters relating to a marine vessel, for example one or more of the following: time, position (latitude & longitude), SOG (speed over ground), COG (course over ground), HDT (true heading), ROT (rate of turn), ETA (estimated time of arrival), draft, trim (pitch), list (roll), pitching, surging, rolling, swaying, yawing, heaving (and their characteristics like period, amplitude, harmonics etc.), vibrations in three dimensions, and propeller/engine RPM.

The sensor device 290 may also comprise several capturing devices, combinations of any above-mentioned devices, and the like. The environmental temperature may comprise air temperature, water temperature or ground surface temperature, for example.

The sensor device 290 may comprise also a communication interface connected to the processor unit. The processor unit is configured to transmit the generated sensor data via the communication interface. Alternatively, the sensor device 290 may be connected to the local computer device 291 without requiring a processing unit within the sensor device 290. The sensor device 290 may also transmit its sensor data via the communication interface 290 to the communication interface 250 of the main system 200.

In an embodiment, the communication interface within the sensor device 290 or the communication interface 293 is, for example, a wireless transmitter or a wireless transceiver (for example, Wireless Local Area Network (WLAN) transceiver or any mobile or cellular communication network transceiver (for example, Wideband Code Division Multiple Access (WCDMA), Long Term Evolution (LTE) etc.) or a local data port (e.g. Ethernet, Universal Serial Bus (USB) etc.).

In an embodiment, the sensor device 290 may also store information identifying the marine vessel. This may have been preconfigured to the sensor device 290. Since the automatic identification system data identifies the marine vessel to which the received data relates to, the sensor device 290 is thus able to make sure that the received automatic identification system data relates to the marine vessel to which the sensor device 290 is affixed. One possibility for identifying the correct marine vessel is to use, for example, wireless signal strength of the AIS signal. The strongest AIS signal relates to the marine vessel to which the sensor device 290 is attached. Yet another possibility is to compare the acceleration signal from the acceleration sensor to the data indicating vessel movements in the AIS signals and to determine the correct AIS signal based on the comparison.

A second sensor device 260 of the marine vessel main information system 200 may comprise corresponding elements as disclosed for the first sensor device 290.

In an embodiment, a sensor device 290 is configured to measure the marine vessel performance related data when the sensor device 290 is affixed to the hull structure of the marine vessel 121. For example, bolting, gluing or any other way for affixing or attaching the sensor device 290 to the hull structure may be used. In other words, since the sensor device 290 is firmly attached to the hull structure, there is no relative motion between the sensor device 290 and the hull structure, and thus the sensor or sensors 290 sense the motions and vibrations of marine vessel via the hull structure.

The AIS receiver (comprised by the communication interface 293 or the communication interface within the sensor device 290) may receive a wireless transmission comprising an AIS signal from the same marine vessel 121 to which the sensor device 290 is affixed. The sensor device 290 may beforehand store information identifying the marine vessel 121 (for example, International Maritime Organization (IMO) ship identification number or Maritime Mobile Service Identity (MMSI)) so that it is able to determine that the AIS signal relates to the marine vessel 121 to which it is affixed. The AIS signal includes several pieces of information relating to the marine vessel, for example, the vessel's identity, type, position, course, speed, navigational status and other safety-related information. The sensor device 290 may transmit to the local computer 291 the AIS signal as it was received (in other words, every piece of information contained in the AIS signal). In another example, the sensor device 290 may select a subset of information included in the AIS signal to be included in the sensor data. In one example, the subset includes at least position and/or time information of the marine vessel 121.

Normally the AIS signal is intended to assist a vessel's watch standing officers to track and monitor movements of other vessels and also allow maritime authorities to track and monitor movements of vessels. It also identifies and locates vessels by electronically exchanging data with other nearby ships.

In an embodiment, the AIS signal is received by a sensor device 290 installed in a vessel that is sending the AIS signal. This makes it possible for the sensor device to link the AIS signal with sensor data measured by the sensor or sensors 290. Since the sensor device 290 has the information included in the AIS signal and measurements from one or more sensors 290, there is no need to make the traditional integration tasks to the marine vessel's information systems. The AIS signal sent by the marine vessel to the sensor device 290 is a strong signal. Therefore, it may not be necessary to install a separate antenna in order to be able to receive the AIS signal. This makes the installation of the sensor device 290 simpler and quicker. For example, it is possible to install the sensor device 290 including only an internal antenna inside a marine vessel because the AIS signal leaks to the interior of the marine vessel via various existing cables, for example.

In an embodiment, a wind sensor is configured to determine or measure wind angle and wind speed. The wind sensor may comprise any element of combination of elements operable to sense wind-related information for use by the apparatus 120. For example, the wind sensor may be operable to sense apparent wind speed, apparent wind angle, true wind speed, true wind angle, wind velocity made good (VMG), combinations thereof, and the like.

In an embodiment, a sail sensor is configured to determine sail information. The sail information provides status of the currently used sails in a boat and timing of their changes. The sail sensor may comprise a first sensor in a mast of the boat and a second sensor in the sail to identify which sail is used in the mast. Based on the information received from these sensors the apparatus 120 may define which sails are used in which masts and the times of changing the sails. The sail information may be thus used as a part of the reference activity data and current activity data.

In an embodiment, a video camera is configured to provide video signal. Based on the video signal the apparatus may determine at least part of the environmental data. For example flute height may be determined based on the video signal from the video camera. The determination may be done by video image processing, pattern recognition, measuring a rocking movement or relative movement of a horizon, for example.

The sensor device 260, 290 may comprise communication interface module implementing at least part of data transmission. The communication interface module may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) or National Marine Electronics Association (NMEA) 0183/2000 standard for example. The communication interface module may be integrated into the sensor device 260, 290 or into an adapter, card or the like that may be inserted into a suitable slot or port of the sensor device 260, 290. The communication interface module may support one radio interface technology or a plurality of technologies. The sensor device 260, 290 may comprise a plurality of communication interface modules.

The sensor device 290 disclosed in FIGS. 2-3 may include at least one accelerometer or three-dimensional accelerometer. Since the sensor device 290 is affixed to the hull of the marine vessel, the accelerometer is able to sense vibrations in the hull. From the vibrations from the hull sensed by the accelerometer, it is possible to determine, for example, speed of rotation of a propeller of the marine vessel or of the main engine. In most vessels, the speed of rotation of the propeller is identical with the speed of rotation of an engine of a marine vessel. Thus, it is possible to determine, based on an analysis of the measurements of the accelerometer, the speed of rotation of a propeller and an engine of a marine vessel.

In an embodiment, in order to determine the speed of rotation of the propeller, the sensor device 290 or the associated computer device may analyze the signals measured by the accelerometer to identify the fundamental frequency in the signals. The fundamental frequency is the RPM (Revolutions Per Minute) of the engine or its multiple. One possible method for pitch detection (i.e. find the fundamental frequency) is the Harmonic Product Spectrum (HPS) method. In the method, a spectrum is compressed a number of times (downsampling), and it is compared with the original spectrum. It can then be seen that the strongest harmonic peaks line up. The first peak in the original spectrum coincides with the second peak in the spectrum compressed by a factor of two, which coincides with the third peak in the spectrum compressed by a factor of three. Hence, when the various spectrums are multiplied together, the result will form a clear peak at the fundamental frequency. It is obvious that the HPS is only one possible method for finding the fundamental frequency and also other methods may be used. The speed of rotation of the propeller may also be stored in the memory of the sensor device 290 or the computer device 291 to be transmitted to or accessed by an external entity. The computer device 291 may comprise a Raspberry Pi type of computer device, for example.

Furthermore, device or apparatus analyzing the sensor data, such as a server apparatus 130, the sensor device itself, or a local computer device 291 may perform frequency analysis of the signals measured by at least one acceleration sensor of the sensor device 290. In case the sensor device or the computer device 291 performs the frequency analysis, the amount of sensor data to be transmitted outside the sensor device/computer device is reduced. The frequency analysis may comprise, for example, frequency-time analysis, such as Short-Time Fourier Transform (STFT) or Discrete Wavelet Transform (WFT). With the frequency analysis, an understanding of frequency components over a short time is received. The frequency analysis is performed, for example, so that motions of a marine vessel 121 can be understood better and also analyzed.

Further, the frequency analysis may comprise applying a dimensionality reduction method, for example, Principal Component Analysis (PCA) in order to identify the most significant components in the frequency domain. The acceleration sensor senses both the direction of earth gravity and motions of acceleration caused by the hull of the marine vessel to different directions. For example, if the marine vessel sways and simultaneously rolls, an acceleration sensor senses (1) the inclination, (2) sidewise acceleration of the marine vessel, (3) the centrifugal force caused by rolling and (4) the centrifugal force caused by change in the direction of the marine vessel.

The sensor device 290 may include at least one gyroscope. Based on the measurements of a gyroscope, it is possible to determine, for example, roll of the marine vessel. While an accelerometer sees simultaneously acceleration and inclination the gyroscope sees the real inclination of the marine vessel. The gyroscope senses angular rate of motion. From the angular rate of motion, it is also possible to calculate inclination by integrating with respect to time. It may be there is a small offset with the gyroscope at the zero position. This can be rectified, for example, by combining data from the acceleration sensor and the gyroscope using Kalman filtering.

The sensor device 290 may include at least one inclinometer. Based on the measurements from an inclinometer, it is possible to determine pitch and/or roll of a marine vessel accurately. If a quasistatic position of the marine vessel is to be determined, the measured signal from the inclinometer can be filtered with a low-pass filter, where the threshold frequency is 30-60 seconds. This filtering operation filters out motions. Further, the measurements of the inclinometer may also be used in determining trim of the marine vessel.

An accelerometer and an inclinometer can be used to measure the same parameters since both of them measure acceleration. One of the main differences is that the accelerometer provides acceleration components separately but they are more inaccurate. However, acceleration components are usually provided within a larger dynamic range. The inclinometer measures inclination more accurately but within a narrower range. Therefore, it is possible to perform RPM measurements also with the inclinometer if its bandwidth is high enough. Further, it may be possible to perform a frequency analysis for the data provided by the inclinometer and get the same or almost the same results than based on accelerometer data. One difference, however, is that the inclinometer does not measure vertical acceleration.

Based on the analysis of the sensor data, it may be possible to determine the operation efficiency of the marine vessel 121 and to automatically trigger service requests for the vessel, for example.

Based on the information available and generated by the sensor device 260, 290 it may be possible to optimize and analyze various factors relating to energy efficiency of a marine vessel. For example, trim may be optimized based on trim, draft and speed information. Further, speed of the marine vessel may be optimized based on speed, draft and RPM information. The accuracy of trim and speed optimization can be further improved by utilizing the motions information as it provides an indirect indicator of waves encountered by the marine vessel and have impact on optimal trim and speed. If the sensor device uses information provided by satellite positioning means, draft information may not be automatically available. Therefore, draft information may be provided manually when performing trim and speed optimization.

Marine vessel data may be generated based on received sensor data from sensor devices with generated time information for the sensor data. Based on the marine vessel data it is possible to determine performance optimization, navigation, or maneuvering information, for example, and transmit the determined information for the marine vessel if determined outside the vessel, for example at remote server.

Further, in the course of time, the hull of the marine vessel may accumulate fouling. This causes extra fuel consumption and is, therefore, not desirable. Excessive fouling in the hull of the marine vessel may be determined, for example, by monitoring the increase of the propeller slip. The amount of propeller slip can be calculated from the information provided by the sensor device. If the propeller slip is found to statistically increase, it may provide an indication of an increased fouling of the hull. Based on the speed and RPM information it is possible to measure or calculate the propeller slip.

Figure 4:
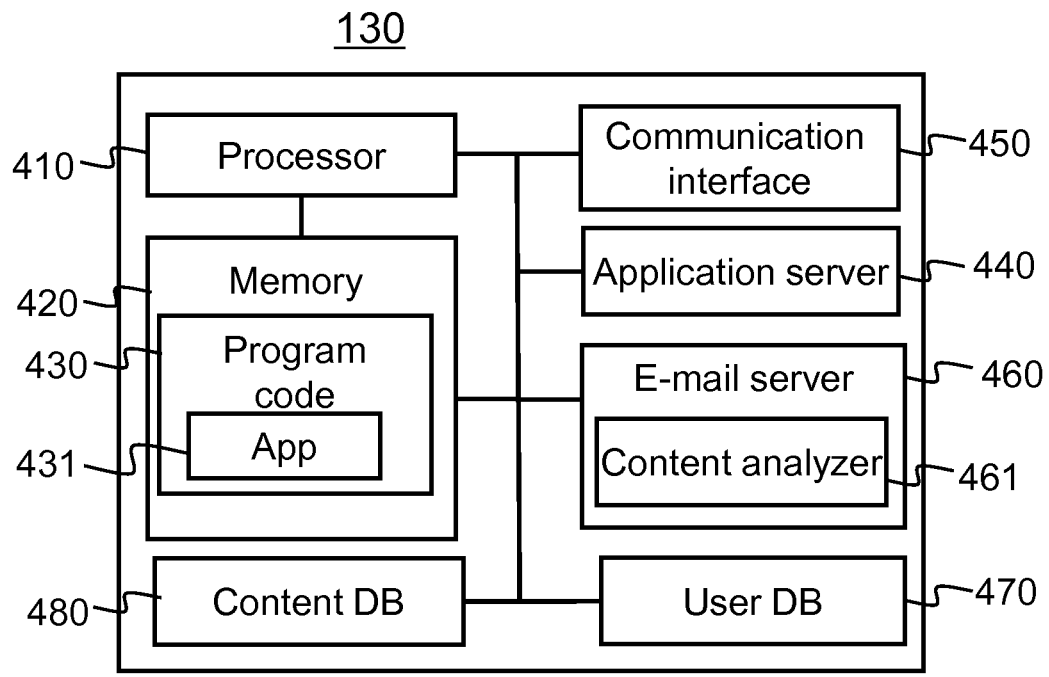
FIG. 4 presents an example block diagram of a server apparatus in accordance with an example embodiment.

FIG. 4 presents an example block diagram of a server apparatus 130 in which various embodiments of the present disclosure may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules, such as service application 431 and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution), or 5G radio module. The wired interface may comprise such as universal serial bus (USB) or National Marine Electronics Association (NMEA) 0183/2000 standard for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. Captured activity data associated with environmental data of the marine vessel apparatus 120 may be received by the server apparatus 130 using the communication interface 450.

The e-mail server process 460, which receives e-mail messages sent from marine vessel apparatuses 120 and remote computer apparatuses 160 via the network 150. The server 460 may comprise a content analyzer module 461, which checks if the content of the received message meets the criteria that are set for new activity data item of the service. The content analyzer module 461 may for example check whether the e-mail message contains a valid activity data item to be used as reference data item. The valid reference data item received by the e-mail server is then sent to an application server 440, which provides application services e.g. relating to the user accounts stored in a user database 470 and content of the content management service. Content provided by the service system 100 is stored in a content database 480.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

According to an embodiment, the determined speed through water (STW) is determined, almost in real time, at the server apparatus 130 based on the sensor data provided from the marine vessel. Timestamps of sensor data items may be detected and time information for the sensor data of the sensor data item may be determined accordingly using embodiments disclosed before processing the sensor data for any purpose, for example STW determination. Determined STW may be transmitted back to the vessel and used by the person navigating the vessel to optimise the operation. Alternatively, STW may be used as input data for remote navigation control of the vessel, such as an unmanned vessel, for example. Optimisation of operation means for example selection of a route of the vessel, selection of a speed of the vessel or both, for example by chasing sea currents. Optimisation may relate to decreasing energy consumption of the vessel, while at the same time keeping up the schedule of a commercial vessel or similar, i.e. to finding an optimal combination of speed and route, while minimising fuel consumption.

In another embodiment, the determined speed through water (STW) is used for assessing the performance of the vessel. The performance can be used for instance to determine the optimal time to wash the vessel's hull in order to decrease amount of biological growth on the hull with the least cost.

According to another embodiment, the method still further comprises obtaining oceanographic current data at the server apparatus 130 and using said data in determining STW of the vessel. This data can be obtained from an outside source, for example weather service providers. Oceanographic current in this description means ocean currents, which are continuous, directed movements of seawater generated by forces acting upon the mean flow, such as breaking waves, wind, the Coriolis effect, cabbeling, temperature and salinity differences, or tides, which are caused by the gravitational pull of the Sun and Moon. Adding current sensor data (received from the marine vessel, for example) of the sensor data items and defining time information for the sensor data using timestamps as disclosed by different embodiments further improves the accuracy of the determined STW.

The method provides a STW measurement that is more robust and accurate than what can be obtained using traditional methods. The accuracy improves when adding more inputs, such as sensor data with more accurate timestamps or time information defined based on timestamps according to embodiments disclosed. The data sources can be combined, for example, using a statistical state-space model.

In another embodiment, the STW is determined in real time. This allows for example optimisation of the steering of the ship, so that the fuel efficiency is maximised. STW may be determined at the server apparatus 130 based on sensor data from the vessel 121 and STW data or remote navigation data for the vessel 121 may be transmitted based on the determined STW. The present disclosure accordingly provides a novel statistical state-space model utilising corrected timestamps or time information of sensor data to estimate the STW for a vessel, for calibration of water logs and for estimating current. Such a state-space formulation is may be used in combining all the data sources to determine STW reliably.

Figure 5:
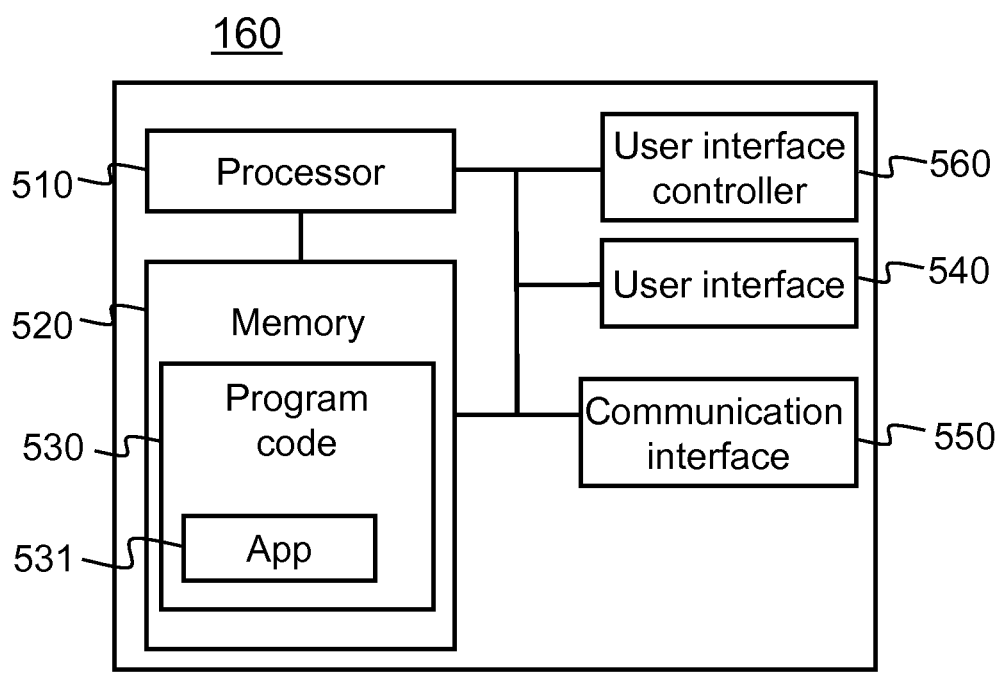
FIG. 5 presents an example block diagram of a remote user device.

FIG. 5 presents an example block diagram of a remote computer apparatus 160 in which various embodiments of the present disclosure may be applied. The computer apparatus 160 may be a user equipment (UE), user device or apparatus, such as a mobile terminal, a smart phone, a laptop computer, a desktop computer or other communication device. The remote control apparatus 160 may be configured to be operated by a remote operator of the vessel 121 (FIG. 1). The remote control apparatus 160 may be arranged on a ground station, on the vessel 121 (FIG. 1) or on another vessel, for example.

The general structure of the computer apparatus 160 comprises a user interface 540, a communication interface 550, a processor 510, and a memory 520 coupled to the processor 510. The computer apparatus 160 further comprises software 530 stored in the memory 520 and operable to be loaded into and executed in the processor 510. The software 530 may comprise one or more software modules, such as remote client software application 531, and can be in the form of a computer program product. The computer apparatus 160 may further comprise a user interface controller 560.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The computer apparatus 160 may comprise a plurality of memories. The memory 520 may be constructed as a part of the computer apparatus 160 or it may be inserted into a slot, port, or the like of the computer apparatus 160 by a user. The memory 520 may serve the sole purpose of storing data, or it may be constructed as a part of an apparatus serving other purposes, such as processing data.

The user interface controller 560 may comprise circuitry for receiving input from a user of the computer apparatus 160, e.g., via a keyboard, graphical user interface shown on the display of the user interfaces 240 of the computer apparatus 160, speech recognition circuitry, or an accessory device, such as a headset, and for providing output to the user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution), or 5G radio module. The wired interface may comprise such as universal serial bus (USB) or National Marine Electronics Association (NMEA) 0183/2000 standard for example. The communication interface module 550 may be integrated into the remote computer apparatus 160, or into an adapter, card or the like that may be inserted into a suitable slot or port of the remote computer apparatus 160. The communication interface module 550 may support one radio interface technology or a plurality of technologies. The computer apparatus 160 may comprise a plurality of communication interface modules 550. Sensor data items may be downloaded from the server apparatus 130 and stored to the remote computer apparatus 160.

A skilled person appreciates that in addition to the elements shown in FIG. 5, the computer apparatus 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the computer apparatus 160 may comprise a disposable or rechargeable battery (not shown) for powering when external power if external power supply is not available.

Figure 6:
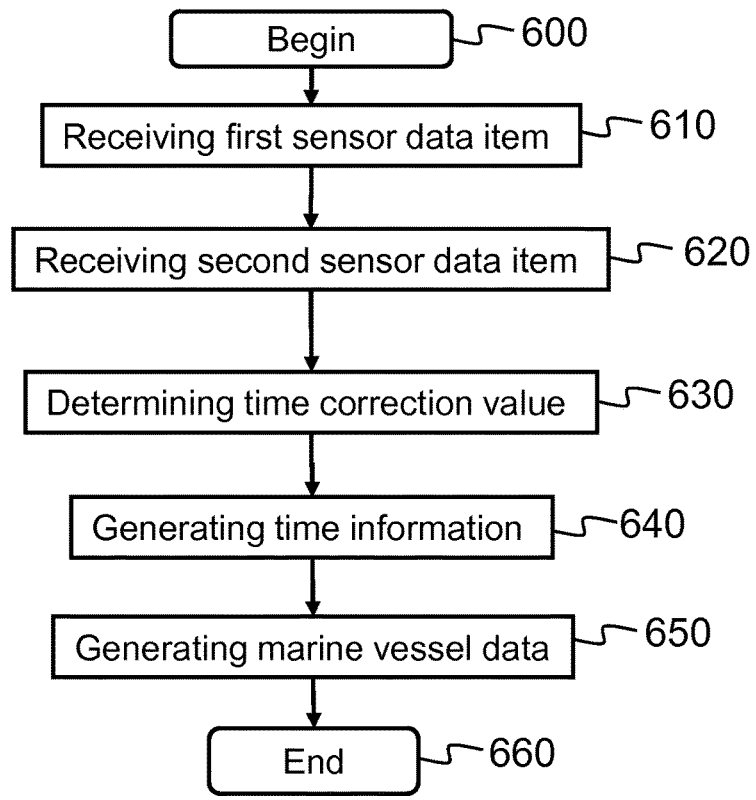
FIG. 6 shows a flow diagram of an exemplary method for providing marine vessel data of a marine vessel with a plurality of sensor devices in accordance with an example embodiment.

FIG. 6 shows a flow diagram showing operations in accordance with an example embodiment of the present disclosure. In step 600, the method is started. In step 610, a first sensor data item comprising first sensor data of a first sensor device of the plurality of sensor devices is received, the first sensor data being associated with a first local timestamp generated based on a local clock. In step 620, a second sensor data item comprising second sensor data of a second sensor device of the plurality of sensor devices is received, the second sensor data being associated with a second local timestamp generated based on the local clock and a first universal timestamp generated based on a universal clock. In step 630, time correction value is determined based on the second sensor data item's second local timestamp and the first universal timestamp. In step 640, time information is generated for the first sensor data of the first sensor device using the first local timestamp and the time correction value. In step 650, marine vessel data is generated using the sensor data with generated time information. The method is ended in step 660.

Figure 7:
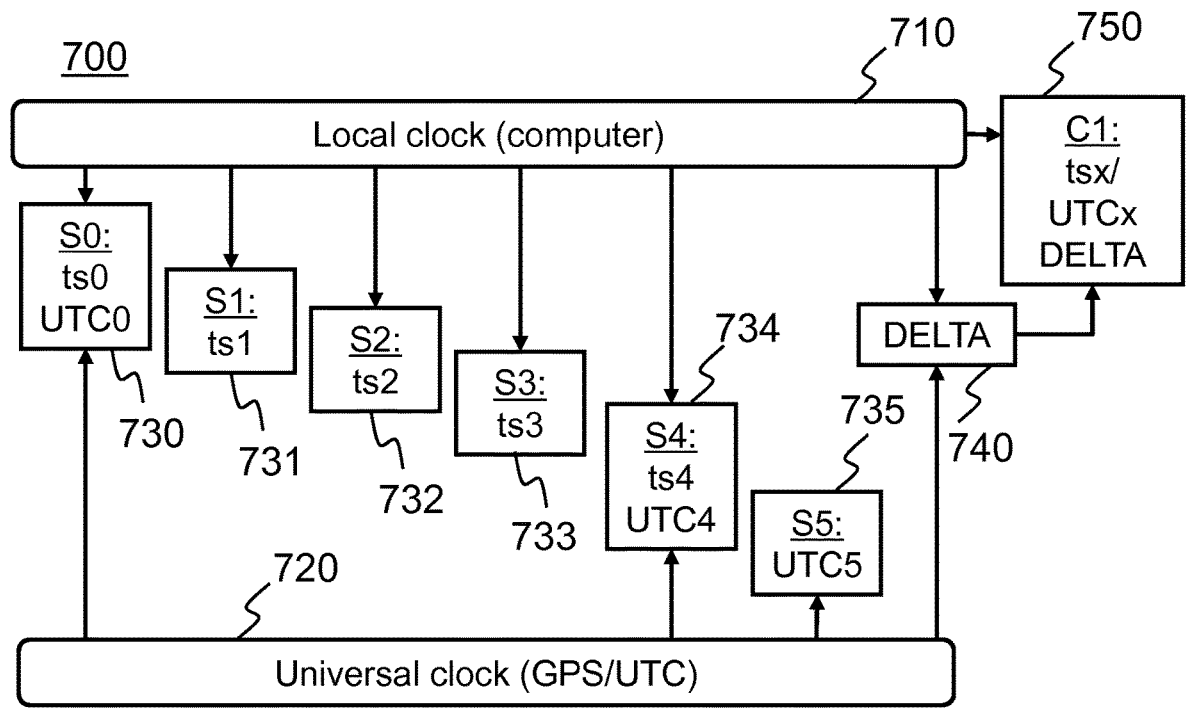
FIG. 7 shows a schematic diagram of an exemplary marine vessel related items for providing marine vessel data of a marine vessel with a plurality of sensor devices in accordance with an example embodiment.

FIG. 7 shows a schematic diagram 700 of an exemplary marine vessel related items for providing marine vessel data of a marine vessel with a plurality of sensor devices in accordance with an example embodiment.

A first sensor data item 731 may be generated comprising sensor data (S1) of a first sensor device 290 (see e.g. FIG. 2) of the plurality of sensor devices 260, 290, associated with a first local timestamp (ts1) generated based on a local clock 710. The first sensor device 290 (see e.g. FIG. 2) may be configured to be integrated to a stand-alone local computer system within the marine vessel. Local clock information of the local clock 710 may be provided by the local computer system (see e.g. FIG. 2). The first sensor data item 731 may be generated by the first sensor device or by the local computer device based on first sensor data provided by the first sensor device.

A second sensor data item 734 may be generated comprising second sensor data (S4) of a second sensor device 260 (see e.g. FIG. 2) of the plurality of sensor devices 260, 290, associated with a second local timestamp (ts4) generated based on the local clock 710 and a first universal timestamp (UTC4) generated based on a universal clock 720. The universal clock 720 is provided by the vessel information system (see e.g. FIG. 2). The second sensor device 260 is configured to be integrated to the marine vessel's information system 200 (see e.g. FIG. 2), and the first sensor device 290 is not configured to be integrated to the marine vessel's information system. The second sensor data item 734 may be generated by one of the sensor devices, by the marine vessel information system or by the local computer device based on sensor data provided by the sensor device(s).

The first 731 and the second sensor data item 734 may be transmitted over a data communication network to a server apparatus for further processing.

Next, time correction value (see 840 in FIG. 8, for example) is determined based on the second sensor data item's 734 second local timestamp (ts4) and the first universal timestamp (UTC4).

Furthermore, after determining the time correction value, time information (see 811 in FIG. 8, for example) for the first sensor data (S1) of the first sensor device may be generated using the first local timestamp (ts1) and the time correction value.

In an embodiment, a third sensor data item 730 may be generated prior to receiving the first sensor data item 731, the third sensor data item 730 comprising third sensor data (S0) of a third sensor device of the plurality of sensor devices, associated with a third local timestamp (ts0) generated based on the local clock 710 and a second universal timestamp (UTC0) generated based on the universal clock, wherein the second universal timestamp (UTC0) is (chronologically) before the first universal timestamp (UTC4).

After receiving the third sensor data item 730, the computer implemented method may be configured to determine second time correction value (see 841 in FIG. 8, for example) based on the third sensor data item's (s0) third local timestamp (ts0) and the second universal timestamp (UTC0), and to generate time information for the sensor data (S1) of the first sensor device using the first local timestamp (ts1) and the first and the second time correction values.

As shown, a plurality of sensors may provide a plurality of other sensor data items 732, 733, 735 comprising sensor data of the relevant sensor device and at least one timestamp, either a timestamp of the local clock 710 or the universal clock 720, or both timestamps.

In an embodiment, at the marine vessel's end, for example by the computer implemented method running on the local computer device, it is possible to determine time correction value (DELTA) 740 locally if clock information of the universal clock 740 is made available during installation, system update, GPS connection or UTC connection, for example.

The sensor data items may be transmitted to a remote server apparatus to process and analyze the sensor data of the received sensor data items as described.

In an embodiment, a local clock data item 750 (C1) may be generated based on local time correction value 740 triggered by the local clock 710 synchronization event, for example. The local clock data item (C1) comprises the time correction value 740 used for the local clock 710 synchronization and at least one of the following: a local timestamp (tsx) and a universal timestamp (UTCx) indicating the time of the synchronization event. The local clock data item 750 may be transmitted to a remote server apparatus and used for sensor data processing as described.

In one embodiment, the sensor system of the present disclosure receives data from different data sources to produce a high-quality, low-bias speed through water (STW) measurement. In an embodiment, a first sensor device is configured to receive at least one of the propeller revolutions per minute, torque at propeller, propulsion power, thrust and engine fuel consumption from a corresponding indirect measurement based on vessel vibrations, as is explained in more detail above.

In one embodiment, the sensor system comprises a first sensor device configured to receive or acquire RPM of propeller, such as a sensor data item 731. Another sensor data item, such as data item 732-733 may be configured to be provided by another first sensor device and to provide, for example at least one of torque at propeller, propulsion power, thrust, and engine fuel consumption. Furthermore, a corresponding combination of indirect measurements is possible based on vessel vibrations captured by at least one first sensor device. The first sensor device is configured to use timestamp based on the local clock 710.

In another embodiment, a second sensor device is configured to acquire data item 734 from the ship's automation system to include universal time from the universal clock 720.

Further, at least one sensor device may also include elements such as transduction functions with an analogue interface circuit, a microcontroller with an integrated analogue-to-digital converter (ADC), and an input/output (I/O) bus interface, a power source, an external memory in addition to the sensor, that collectively operate to receive data related to propulsion of the vessel associated with a timestamp. In an example, propulsion power, thrust, or engine fuel flow is used instead of torque at propeller. In another example, an indirect measurement of the propulsion system arises from a separate sensor device that registers vessel hull vibrations and estimates propulsion variables.

Further, the sensor system comprises a third sensor device configured to receive or acquire the speed over ground of the vessel, such as data of the item 735. In one embodiment, the third sensor device may be also a data source, such as a sensor unit, operable to receive the speed over ground of the vessel. In an embodiment, the speed over ground of the vessel may be gathered using space-based navigation system (sensor unit), such as global positioning system (GPS, see e.g. 110 in FIG. 1) or chart plotter and the like and associated with the universal clock 720 based timestamp.

In one embodiment, the sensor system also comprises a fourth sensor device configured to receive oceanographic current data and capable to provide data item 730-735 related to course of the marine vessel, wherein the processor is further configured to use the received data in determining the speed through water of the vessel. In an embodiment, the oceanographic data pertains to the forecasted oceanographic current calculated for the route of the marine vessel. In an embodiment, a forecast provider, that uses a numerical ocean model and multiple data sources to estimate the ocean current, produces the oceanographic current forecasts. Such data may be received by the server apparatus 130 from another service server apparatus based on location information of the vessel. The data may also be received by the vessel and provided to the server apparatus 130 as vessel sensor data.

In another embodiment, the sensor system also comprises a fifth sensor device configured to receive data from a speed through water log and capable to provide data item 730-735, the processor being further configured to use the obtained data in determining the speed through water (STW) of the vessel and calibrating the speed through water log data. The fifth sensor device may also be configured to acquire STW data from the automation system. The device is interfaced with peripheral equipment like display devices or a voyage data recorder and so forth and may utilise timestamps of any available clock 710, 720.

Additionally, a storage device may be configured at the marine vessel information system 200 and/or the stand-alone local computer system 201 (see e.g. FIG. 2) to store the sensor device information received by any of the first, second, third, fourth and fifth sensor devices. For example, the storage device may store data such as RPM, torque, SOG, STW, and oceanographic current forecasts before transmitting to the server apparatus 130 or as local data for usage by the vessel processing systems.

Figure 8:
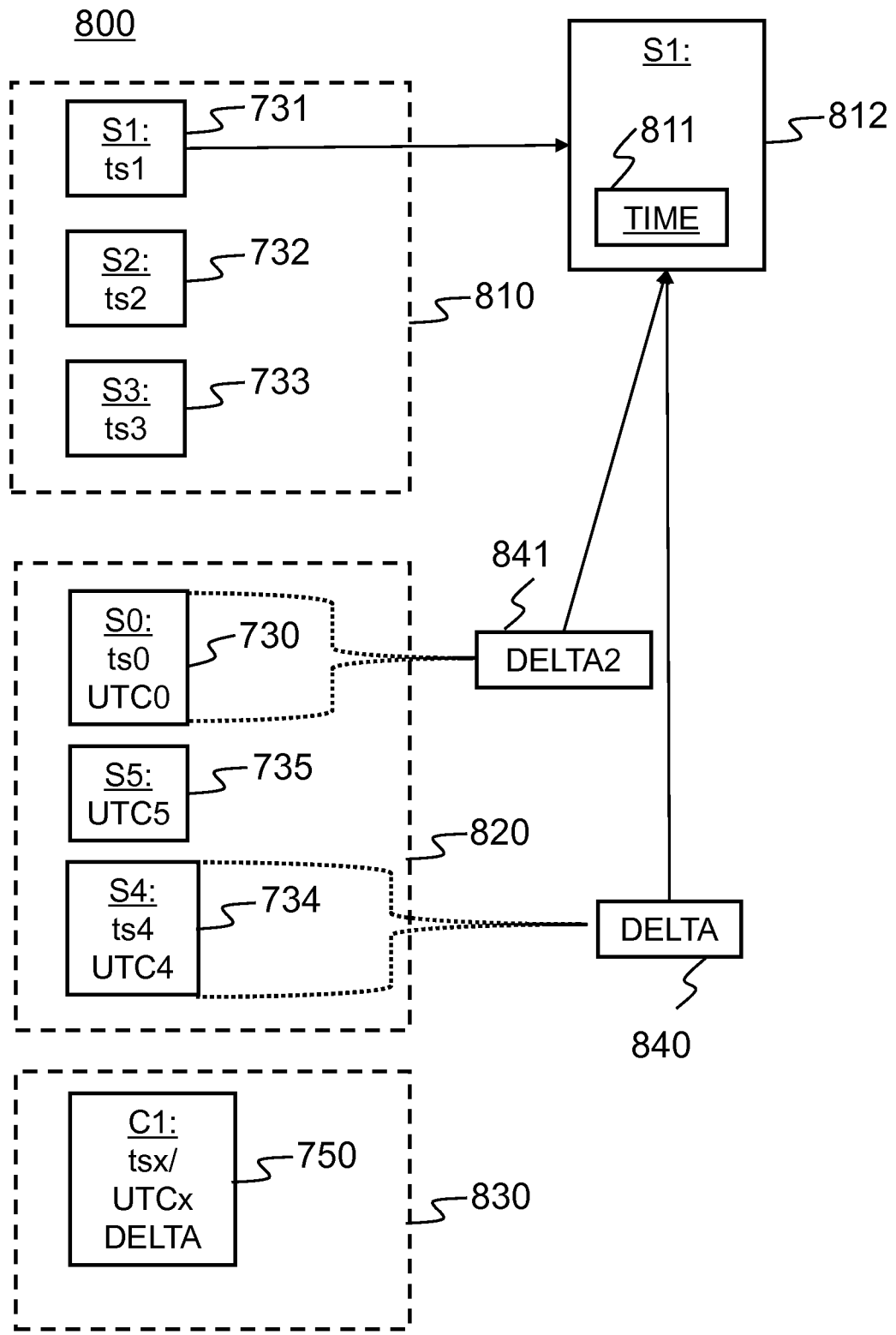
FIG. 8 shows a schematic diagram of an exemplary server received items and processing for providing marine vessel data of a marine vessel with a plurality of sensor devices in accordance with an example embodiment.

FIG. 8 shows a schematic diagram 800 of an exemplary server received items and processing for providing marine vessel data of a marine vessel with a plurality of sensor devices in accordance with an example embodiment.

In an embodiment, a server apparatus (such as server 130 in FIG. 1) is configured to perform a computer implemented method for providing marine vessel data of a marine vessel with a plurality of sensor devices. The server apparatus may receive a plurality of sensor data items 730-735 or clock synchronization items 750 over various communication paths 810-830. First sensor data items 731-733 may be received over a first communication path 810 that may utilize a communication channel between the communication interface of the local computer device 201 (see e.g. 290-293 of FIGS. 2-3) and the server apparatus (see e.g. 130-131 of FIG. 1). Second sensor data items 730, 734-735 may be received over a second communication path 820 that may utilize a communication channel between the communication interface 293 of the local computer device 201 (see e.g. 290-293 of FIGS. 2-3) or of the marine vessel information system 200 (see e.g. 250 of FIG. 2), and the server apparatus (see e.g. 130-131 of FIG. 1). Clock data items 750 may be received over a third communication path 830 that may utilize a communication channel between the communication interface 293 of the local computer device 201 (see e.g. 290-293 of FIGS. 2-3) or of the marine vessel information system 200 (see e.g. 250 of FIG. 2) and the server apparatus (see e.g. 130-131 of FIG. 1).

The computer implemented method at the server apparatus is configured to perform a step of receiving a first sensor data item 731 comprising first sensor data (S1) of a first sensor device of the plurality of sensor devices, associated with a first local timestamp (ts1) generated based on local clock information of a local clock.

Next, the server apparatus is configured to perform a step of receiving a second sensor data item 734 comprising second sensor data (S4) of a second sensor device of the plurality of sensor devices, associated with a second local timestamp (ts4) generated based on local clock information of the local clock and a first universal timestamp (UTC4) generated based on universal clock information of a universal clock.

Furthermore, the server apparatus is configured to perform a step of determining time correction value (DELTA) 840 based on the second sensor data item's 734 second local timestamp (ts4) and the first universal timestamp (UTC4).

In response to determining the time correction value (DELTA) 840 the server apparatus is configured to perform step of generating time information 811 for the first sensor data (S1) of the first sensor device using the first local timestamp (ts1) and the time correction value (840). A time corrected data item 812 is thus generated with sensor data (S1) and more accurate time information 811.

In an embodiment, the server apparatus is configured to perform a step of receiving a third sensor data item 730 that is (chronologically) generated prior to the first sensor data item 731, and the third sensor data item 730 comprises thirds sensor data of a third sensor device of the plurality of sensor devices, associated with a third local timestamp (ts0) generated based on local clock information of the local clock and a second universal timestamp (UTC0) generated based on universal clock information of the universal clock, wherein the second universal timestamp (UTC0) is (chronologically) before the first universal timestamp (UTC4).

Then, the server apparatus is configured to perform a step of determining second time correction value (DELTA2) 841 based on the third sensor data item's (s0) third local timestamp (ts0) and the second universal timestamp (UTC0) and generating time information for the first sensor data of the first sensor device using the first local timestamp (ts1) and the first and the second time correction values (DELTA, DELTA2) 840, 841.

In an embodiment, the server apparatus may be further configured to perform a step of generating the time information 811 for the sensor data (S1) of the first sensor device using the first local timestamp (ts1) and the first and the second time correction values 840, 841 by linear interpolation using the first and the second time correction values 840, 841.

In an embodiment, the server apparatus may be further configured to perform a step of generating time information for sensor data of a sensor device using a local timestamp and the first and the second time correction values 840, 841 by linear extrapolation using the first and the second time correction values 840, 841.

Figure 9:
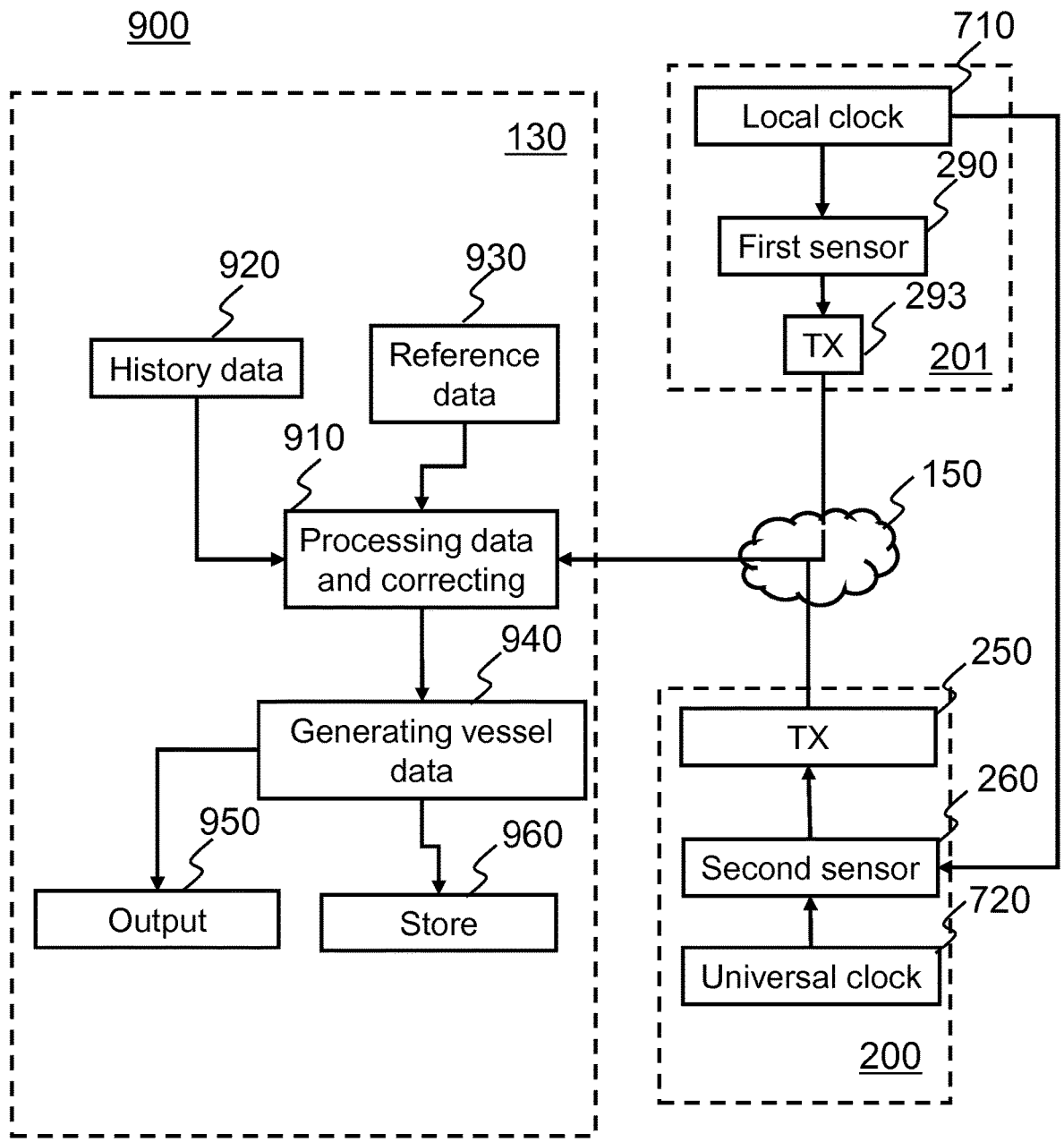
FIG. 9 shows a schematic diagram method for providing marine vessel data of a marine vessel with a plurality of sensor devices in accordance with an example embodiment.

FIG. 9 shows a schematic diagram method for providing marine vessel data of a marine vessel with a plurality of sensor devices in accordance with an example embodiment.

A computer implemented method for providing marine vessel data of a marine vessel with a stand-alone system 201 and a vessel information system 200 with a plurality of sensor devices 260, 290 is provided, wherein first sensor data of the first sensor device 290 may be transmitted to the server apparatus 130 over communication interface 293 and a network 150, and second sensor data of the second sensor device 260 may be transmitted to the server apparatus 130 over communication interface 250 (see e.g. FIG. 2) and a network 150, such as Internet.

The method may further comprise receiving a first sensor data item comprising first sensor data of the first sensor device 290 associated with a first local timestamp generated based on local clock information of a local clock 710 and receiving a second sensor data item comprising second sensor data of a second sensor device 260 associated with a second local timestamp generated based on local clock information of the local clock 710 and a first universal timestamp generated based on universal clock information of a universal clock 720.

At the server apparatus 130, the method may further comprise a step 910 of determining time correction value based on the second sensor data item's second local timestamp and the universal timestamp, and generating time information for the first sensor data of the first sensor device 290 using the first local timestamp and the time correction value.

Step 910 of determining time correction and processing sensor data may also utilize history data 920 and/or reference data 930. The history data 920 may comprise earlier sensor data received from sensor devices of the particular marine vessel, for example. The reference data 930 may comprise reference sensor data received from sensor devices of another marine vessel (e.g. same fleet or convoy of vessels), for example. The history data 920 and the reference data 930 may be used for processing and/or correcting sensor data items received from the first sensor 290 and the second sensor 260, for example. Missing or corrupted sensor data from sensors 260, 290 may be replaced or updated by using the history data 920 and the reference data 930.

Marine vessel data is generated in step 940 based on sensor data with generated/adjusted time information as disclosed. The marine vessel data may comprise information related to speed through water, RPM, heading, or any performance status of the vessel, for example.

Generated vessel data of step 940 may be transmitted in step 950 to the vessel 121, to remote control device 160 or to cloud storage 131, for example.

Generated vessel data of step 940 or processed data of step 910 may be stored in step 960 within the server apparatus 130 for history data 920 and/or reference data 930, for example.

Figure 10:
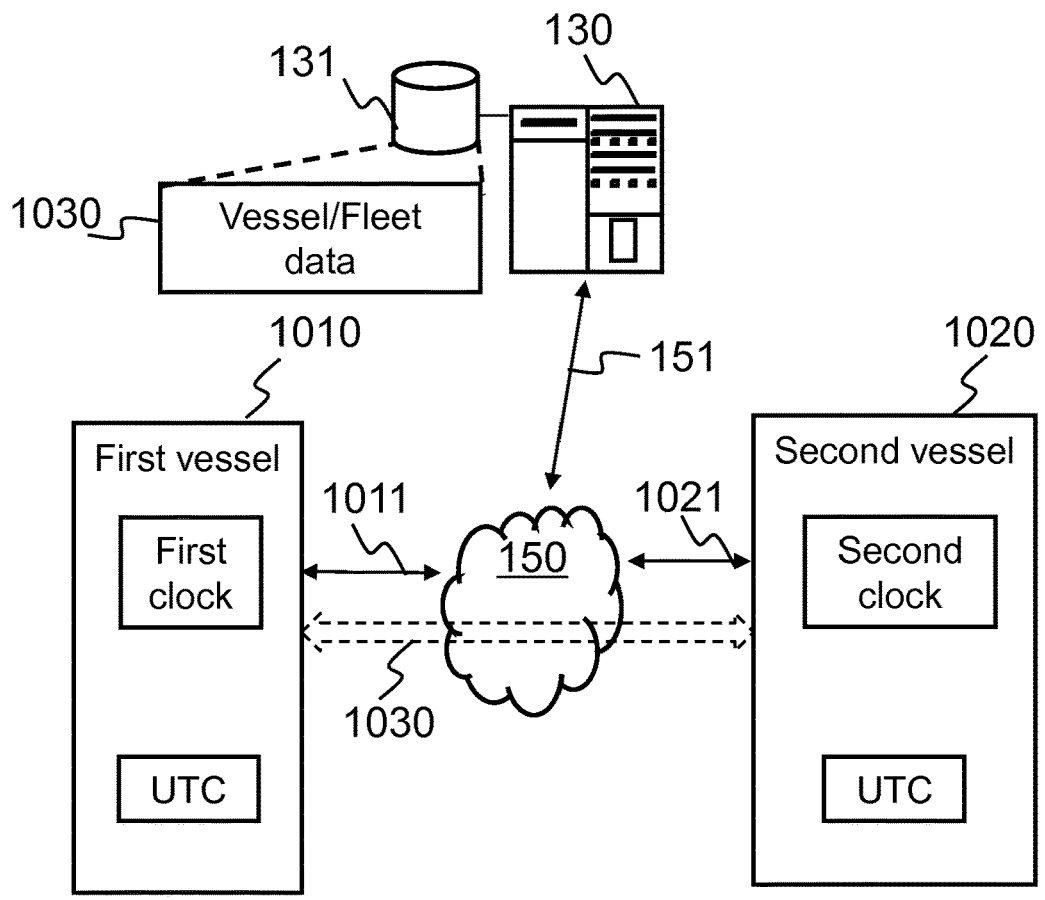
FIG. 10 shows a schematic diagram method for providing fleet data of a plurality of marine vessels with a plurality of sensor devices in accordance with an example embodiment.

FIG. 10 shows a schematic diagram method for providing fleet data 1030 of a plurality of marine vessels 1010, 1020 with a plurality of sensor devices in accordance with an example embodiment.

A first marine vessel 1010 may comprise a first local clock and universal clock to provide timestamps for sensor data items of the first vessel 1010 to be transmitted over local connection 1011 to the network 150 and therefrom over connection 151 to a server apparatus 130, 131.

A second marine vessel 1020 may comprise a second local clock and universal clock to provide timestamps for sensor data items of the second vessel 1020 to be transmitted over local connection 1021 to the network 150 and therefrom over connection 151 to a server apparatus 130, 131.

Furthermore, marine vessel fleet data 1030 may be generated based on the received sensor data of the plurality of marine vessels 1010, 1020 and using the generated time information for the sensor data of a sensor device as disclosed within different embodiments above. Based on the generated marine vessel fleet data it is possible to determine fleet performance optimization, navigation, or maneuvering information based on the generated marine vessel fleet data, and transmit the determined information for the plurality of marine vessels.

In an embodiment, the first marine vessel 1010 and the second marine vessel 1020 may also transceive sensor data items directly over the network 150 via a communication link 1030. Thus, sensor data items and associated timestamps from another vessel may be utilized for vessel data generation at another vessel, for example. The communication link 1030 may also be provided directly without any public network 150 when in harbor or when navigating on sea close to each other. One example embodiment is for two vessels rendezvous at the sea, for example travelling on same route to different directions.

Figure 11:
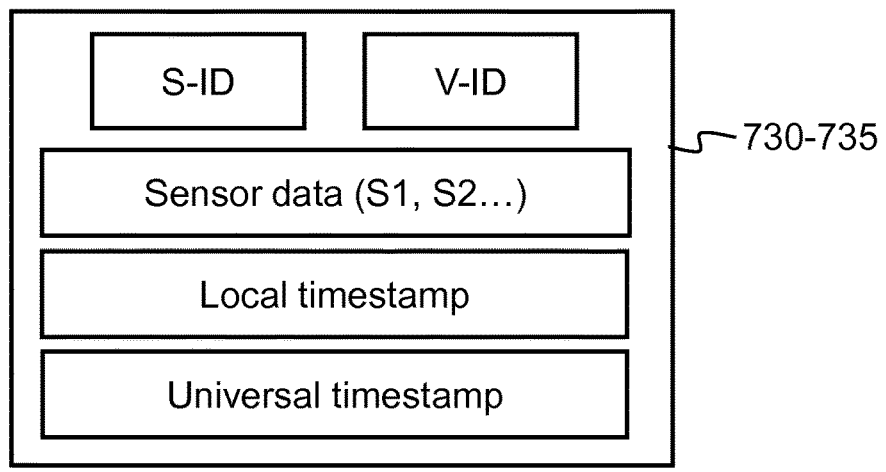
FIG. 11 shows a schematic diagram of a sensor data item in accordance with an example embodiment.

FIG. 11 shows a schematic diagram of a sensor data item in accordance with an example embodiment. The sensor data item 730-735 as disclosed may comprise at least one identifier. The identifier may be configured to identify at least one of the following: the sensor device (S-ID), and the marine vessel (V-ID) where the sensor device is located. The sensor data item 730-735 further comprises sensor data (S1, S2 etc.) and at least one of the local timestamp and the universal timestamp. At least one sensor data item 730-735 is configured to comprise only a local timestamp and at least one sensor data item 730-735 is configured to comprise both local timestamp and universal timestamp, as disclosed above relating to different embodiments.

Without in any way limiting the scope, interpretation, or application of the claims appearing below, a technical effect of one or more of the example embodiments disclosed herein is an improved system for sensor data processing.

A technical effect of one or more of the example embodiments disclosed herein is that reliability of sensor data time information is improved. A technical effect of one or more of the example embodiments disclosed herein is that timestamp accuracy is improved. A further technical effect of one or more of the example embodiments disclosed herein is that timestamp associated with sensor data of a sensor device not having access to universal time information, is improved. A further technical effect of one or more of the example embodiments disclosed herein is that time information of sensor data sent to a server apparatus may be adjusted reliably afterwards at the server apparatus, for example. A further technical effect of one or more of the example embodiments disclosed herein is that accuracy of sensor data is improved. Another technical effect of one or more of the example embodiments disclosed herein is that wider variety of sensor devices may be used. Another technical effect of one or more of the example embodiments disclosed herein is that sensor data system security is improved when stand-alone sensors may be used to generate sensor data without access needed to marine vessel information system and the time information for all sensor data can be improved.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications that may be made without departing from the scope of the present disclosure as defined in the appended claims.

The invention claimed is:

1. A computer implemented method for providing marine vessel data of a marine vessel with a plurality of sensor devices including a first sensor device and a second sensor device, wherein the second sensor device is configured to be integrated into an information system of the marine vessel, and the first sensor device is configured not to be integrated into the information system of the marine vessel, the method comprising:

receiving a first sensor data item comprising first sensor data of the first sensor device, the first sensor data being associated with a first local timestamp generated based on a local clock, and the first sensor data item comprises the first local timestamp;

receiving a second sensor data item comprising second sensor data of the second sensor device, the second sensor data being associated with a second local timestamp generated based on the local clock and with a first universal timestamp generated based on a universal clock, and the second sensor data item comprises the second local timestamp and the first universal timestamp, and wherein the first sensor device does not have access to the universal clock;

determining a time correction value based on the second sensor data item's second local timestamp and the first universal timestamp; and generating time information for the first sensor data of the first sensor device using the first local timestamp and the time correction value.

2. A server apparatus for providing marine vessel data of a marine vessel with a plurality of sensor devices including a first sensor device and a second sensor device, wherein the second sensor device is configured to be integrated into an information system of the marine vessel, and the first sensor device is configured not to be integrated into the information system of the marine vessel, the server apparatus comprising:
a communication interface;
at least one processor; and
at least one memory including computer program code;
the at least one memory and the computer program code configured to, with the at least one processor, cause the apparatus to:
receive a first sensor data item comprising first sensor data of the first sensor device of the plurality of sensor devices, the first sensor data being associated with a first local timestamp generated based on a local clock, and the first sensor data item comprises the first local timestamp;
receive a second sensor data item comprising second sensor data of the second sensor device of the plurality of sensor devices, the second sensor data being associated with a second local timestamp generated based on the local clock and a first universal timestamp generated based on a universal clock, and the second sensor data item comprises the second local timestamp and the first universal timestamp, wherein the first sensor device does not have access to the universal clock;
determine time correction value based on the second sensor data item's second local timestamp and the first universal timestamp; and
generate time information for the first sensor data of the first sensor device using the first local timestamp and the time correction value.

3. The method of claim 1, wherein the first sensor device is configured to be integrated to a stand-alone local computer system within the marine vessel.

4. The method of claim 1, further comprising:
Receiving a third sensor data item prior to receiving the first sensor data item, the third sensor data item comprising third sensor data of a third sensor device of the plurality of sensor devices, the third sensor data being associated with a third local timestamp generated based on the local clock and a second universal timestamp generated based on the universal clock, and the third sensor data item comprises the third local timestamp, and wherein the second universal timestamp is chronologically before the first universal timestamp;

determining a second time correction value based on the third sensor data item's third local timestamp and the second universal timestamp; and generating time information for the first sensor data of the first sensor device using the first local timestamp and the first and the second time correction values.

5. The method of claim 4, further comprising:
generating the time information for the first sensor data of the first sensor device using the first local timestamp and the first and the second time correction values by linear interpolation of the first and the second time correction values.

6. The method of claim 1, further comprising:
receiving a local clock data item triggered by a local clock synchronization event, wherein the local clock data item comprises the time correction value used for the local clock synchronization and at least one of the following: a local timestamp and a universal timestamp indicating the time of the synchronization event, and wherein local clock information of the local clock is determined based on a local computer device of the marine vessel.

7. A sensor apparatus comprising:
a plurality of sensor devices including a first sensor device and a second sensor device, wherein the second sensor device is configured to be integrated into an information system of the marine vessel, and the first sensor device is configured not to be integrated into the information system of the marine vessel;
a communication interface;
at least one processor; and
at least one memory including computer program code;
the at least one memory and the computer program code configured to, with the at least one processor, cause the apparatus to:
transmit a first sensor data item comprising first sensor data of the first sensor device of the plurality of sensor devices, the first sensor data being associated with a first local timestamp generated based on a local clock, and the first sensor data item comprises the first local timestamp;
transmit a second sensor data item comprising second sensor data of the second sensor device of the plurality of sensor devices, the second sensor data being associated with a second local timestamp generated based on the local clock and a first universal timestamp generated based on a universal clock, and the second sensor data item comprises the second local timestamp and the first universal timestamp and wherein the first sensor device does not have access to the universal clock.

8. The apparatus of claim 7, wherein the communication interface comprises at least one of the following: a Global Positioning System (GPS) receiver and a communication interface for transceiving information over a network.

9. The method of claim 1, further comprising:
generating marine vessel data based on the received sensor data of the first and the second sensor device and using the generated time information for the sensor data of the first sensor device.

10. The method of claim 9, further comprising:
determining performance optimization, navigation, or maneuvering information based on the generated marine vessel data; and
transmitting the determined information for the marine vessel.

11. The method of claim 1, wherein universal clock information of the universal clock is determined based on a vessel receiver device, comprising at least one of the Global Positioning System (GPS) receiver and a communication interface of the marine vessel, wherein the universal clock information comprises at least one of the following: a Global Positioning System (GPS) time and a Coordinated Universal Time (UTC).

12. The method of claim 1 further comprising:
providing marine vessel data of a plurality of marine vessels each with a plurality of sensor devices by:
receiving the first sensor data item from each of the plurality of the marine vessels;
receiving the second sensor data item from each of the plurality of the marine vessels;
determining time correction value for each first sensor data item based on respective second sensor data item's second local timestamp and the first universal timestamp; and
generating time information for the first sensor data of the first sensor device using the respective first local timestamp and the respective time correction value.

13. The method of claim 12, further comprising:
generating marine vessel fleet data based on the received sensor data of the plurality of marine vessels and using the generated time information for the sensor data for a plurality of marine vessels of the marine vessel fleet.

14. The method of claim 11, further comprising:
maintaining the local clock information generated by the local clock at a local computer device at the marine vessel with the plurality of sensor devices for providing local timestamps; and
maintaining the universal clock information generated by the universal clock as trusted clock information for providing universal timestamps.

15. The method of claim 1, wherein the sensor data item further comprises a sensor device identifier for identifying the sensor device generating the sensor data within the sensor data item.

16. The method of claim 1, further comprising:
generating a synchronization message for a local computer device in response to determining the time correction value, wherein the synchronization message comprises the time correction value; and
transmitting the synchronization message for the local computer device for synchronizing the local clock of the local computer device based on the time correction value.

17. The method of claim 1, wherein the sensor data relates to performance data of the marine vessel measured by at least one sensor device.

18. The method of claim 17, wherein the at least one sensor device for measuring marine vessel performance data comprises an acceleration sensor operable to measure vibrations and configured to determine speed of rotation of a propeller of the marine vessel based on the measured vibrations.

19. The method of claim 13, further comprising:
determining fleet performance optimization, navigation, or maneuvering information based on the generated marine vessel fleet data; and
transmitting the determined information for the plurality of marine vessels.

* * * * *